Haruo Kawamoto
INVENTOR.

United States Patent Office 3,570,308
Patented Mar. 16, 1971

3,570,308
LINEARIZING CIRCUIT DEVICE FOR AN
ELECTROMAGNETIC LOG
Haruo Kawamoto, Tokyo, Japan, assignor to Tokyo Keiki
Seizosho Co., Ltd., Tokyo, Japan
Filed Aug. 14, 1969, Ser. No. 850,013
Claims priority, application Japan, Aug. 20, 1968,
43/71,363
Int. Cl. G01p 5/08
U.S. Cl. 73—181                           5 Claims

ABSTRACT OF THE DISCLOSURE

A circuit for linearizing without contact a voltage detected by a detector involved in an electromagnetic log, which does not in many cases bear a linear ratio to the speed of a ship.

Figure 1:
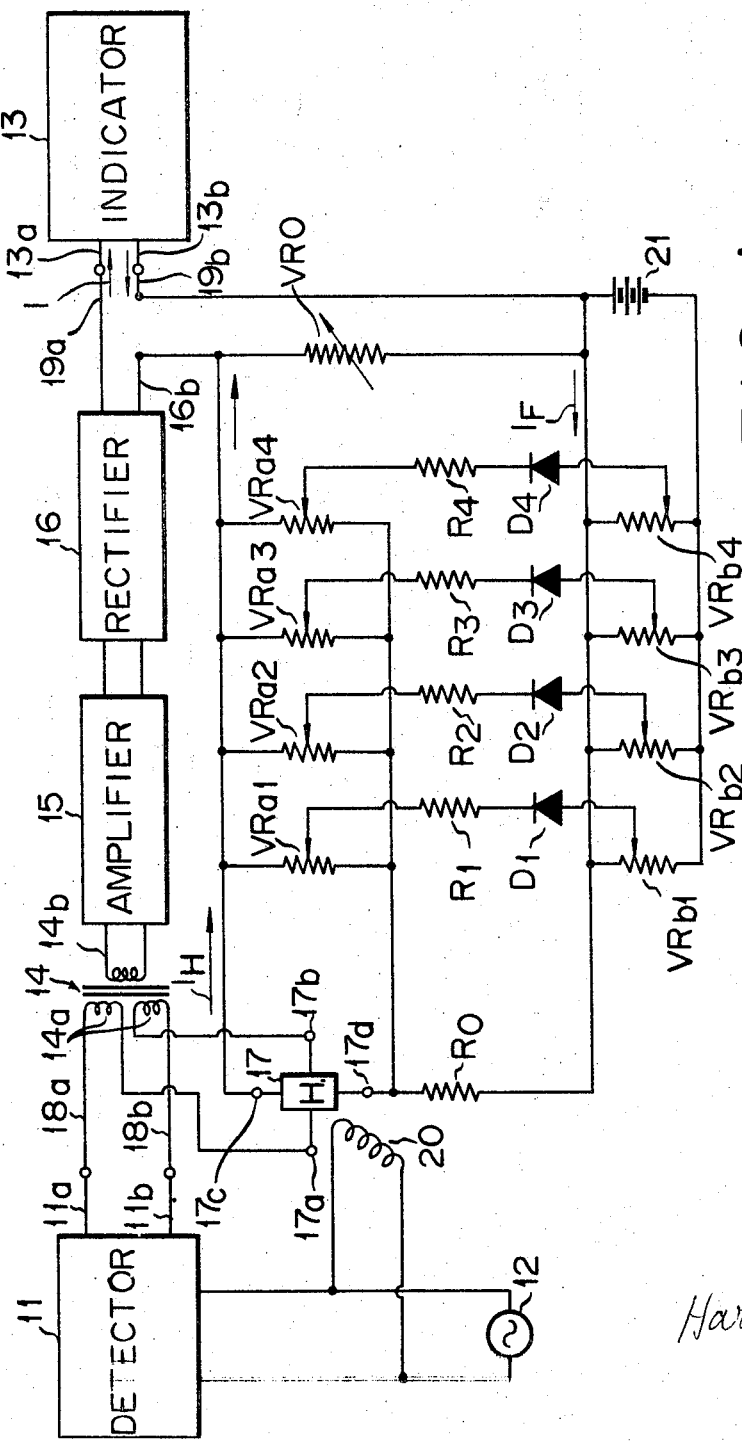

Said detected voltage is rectified by a rectifier provided with a negative feedback means consisting of a Hall element, and the rectified D.C. output is supplied to an indicator. Across the input terminals of the Hall element is connected a variable impedance means consisting of a group of diodes and potentiometers. Said variable impedance means varies the ratio which the input current to the Hall element bears to the aforesaid D.C. output, thereby adjusting the negative feedback ratio.

---

The present invention relates to a linearizing circuit device and more particularly to a linearizing circuit device for an electromagnetic log which compensates the voltage detected by a detector involved in said electromagnetic log in such a manner that said voltage bears a linear ratio to the speed of a ship.

For determining the water speed of a ship is generally used an electromagnetic log comprising of a detector and an indicator. This device allows fields to distribute in the water or electromagnetic fluid under the ship bottom in such a manner that a direction of the field is substantially perpendicular to a flowing direction of the water, or in fact said field to be shifted through the water due to the travel of a ship, thereby a voltage having a magnitude proportionate to the product arrived at by multiplying the flux density of said alternating field by the flow rate of water or water speed of a ship is induced in that part of the water where there is distributed said alternating field, and to detect the voltage so as to determine said speed from the value of the detected voltage. Theoretically, said induced voltage bears a linear ratio to the water speed of a vessel, but in fact does not due to the effect of the adjoint flow of water under the ship bottom and other factors. Accordingly it is necessary to compensate the detected voltage in such a manner to bear a linear ratio to the actual water speed of a ship.

A means heretofore used in linearizing said detected voltage was a mechanical type. The conventional means consisted in, for example, urging the movable element of a potentiometer interlockingly operable with the indicator of the electromagnetic log by means of a motor driven by said detected voltage, and negatively feeding a voltage generated in said movable element back to the detected voltage. According to said means, the resistor of the potentiometer was provided with a plurality of intermediate taps, and across every two adjacent taps was connected a variable resistor. The resistance of each resistor was previously set at a desired value so as to vary the potential obtained from the movable element located at a precribed position, thereby adjusting the ratio of the negative feedback and linearizing the detected voltage.

The aforementioned prior art linearizing technique relied on a mechanical device and had the drawbacks that very accurate compensation was difficult to realize and an apparatus based on such technique had a short life and complicated mechanism.

It is accordingly the object of the present invention to provide a linearizing circuit device for an electromagnetic log which is free from the abovementioned shortcomings encountered with the prior art. Namely, the invention is intended to linearize the voltage detected by a detector with great accuracy by an electric and non-contact means and not by a mechanical means.

To this end, the present invention provides a linearizing circuit device for an electromagnetic log which comprises a rectifying means, electromagnetic coil, Hall element and variable impedance means thereby to compensate the voltage detected by the detector of an electromagnetic log in such a manner to bear a linear ratio to the speed of a ship and supply the resultant output to the indicator of said electromagnetic log, wherein:

(a) The rectifying means has a pair of input terminals to be connected to the detecting terminals of the detector and a pair of output terminals to be connected to the input terminals of the indicator so as to rectify the detected voltage to a direct output current and supply it to the indicator;

(b) The electromagnetic coil is energized by an A.C. source to supply the Hall element with an alternating field synchronizing with the detected voltage;

(c) The Hall element has a pair of input terminals serially connected to one of the output terminals of the rectifying means and a pair of output terminals serially connected to one of the input terminals of said rectifying means, thereby receiving part of said output current as an input current and negatively feeding the Hall voltage generated by said input current and alternating field back to the input side of the rectifying means; and (d) The variable impedance means comprising of a plurality of diode elements which are connected to the input side of the Hall element and impressed with a bias voltage due to resistance drop proportionate to said output current and selectively conducted according to the different desired values of said output current, said selective conduction of the diodes allowing the ratio which the input current to the Hall element bears to said output current to be adjusted to a desired level according to the magnitude of said output current, whereby the Hall voltage of the Hall element is adjusted to a desired value and in consequence the ratio of negative feedback is controlled to a desired value according to the magnitude of said output current.

Figure 2:
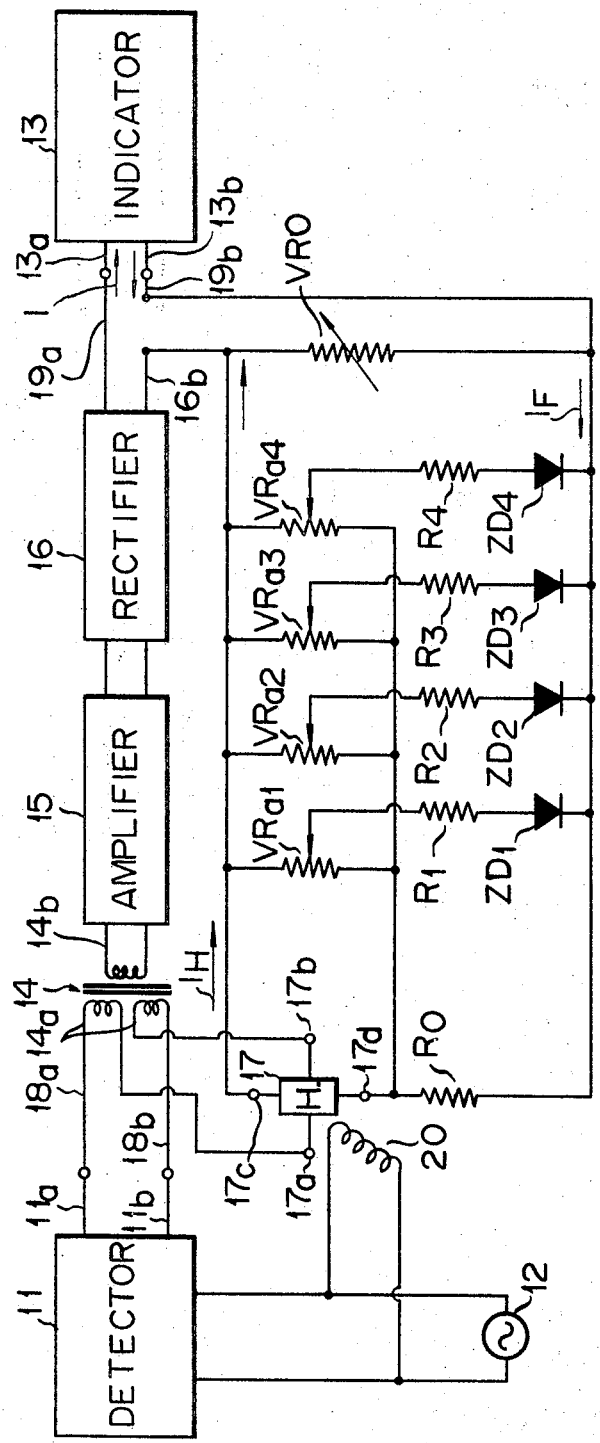

The present invention will be more clearly understood by reference to the appended drawings, in which:

FIG. 1 illustrates a linearizing circuit device according to an embodiment of the present invention together with the detector and indicator thereof; and FIG. 2 is a linearizing circuit device according to another embodiment of the invention.

Referring to FIG. 1, numeral 11 denotes the detector of an electromagnetic log. As is generally known, the detector comprises an electromagnetic coil (not shown) disposed near the ship bottom and energized by an A.C. source 12 so as to distribute an alternating field in the water under the ship bottom and a pair of electrodes (not shown) which are so located under the ship bottom as to be brought into contact with the water within the area where there is distributed said magnetic field and intended to detect the voltage induced by said magnetic field and the water flowing through said magnetic field. Between the detecting terminals 11a and 11b drawn out of these electrodes there is brought the detected voltage, i.e., an A.C. voltage corresponding to the water speed of a ship.

Across the detecting terminals 11a and 11b of the detector 11 and the input terminals 13a and 13b of the indicator 13 is connected the linearising circuit device of the present invention. This linearizing circuit device is formed of an input transformer 14, A.C. amplifier 15, rectifier 16, negative feedback Hall element 17, a variable impedance means comprising diodes D and potentiometers VR.

The input transformer 14 is provided with primary and secondary windings 14a and 14b. Both ends of the primary winding 14a are connected to the detecting terminals 11a and 11b of the detector through the input terminals 18a and 18b of the linearizing circuit device. The primary winding 14a is divided into two parts at a substantially middle point and across these two divided parts of said winding 14a are connected the output terminals 17a and 17b of the Hall element 17. The secondary winding 14b of the input transformer 14 is connected through the A.C. amplifier to the input side of a rectifier 16, for example, a synchronous rectifier. One 16a of the output terminals of the rectifier 16 is concurrently used as one 19a of the output terminals of the linearizing circuit device and directly connected to one 13a of the input terminals of the indicator 13 and the other output terminal 16b of the rectifier 16 is connected to the other output terminal 19b of the linearizing circuit device through the input terminals 17c and 17d of the Hall element 17 and resistor $R_0$. The Hall element is provided with an electromagnetic coil 20 energised by the A.C. source 12 which also actuates the electromagnetic coil of the detector 11. Said electromagnetic coil 20 supplies the Hall element with an alternating field in a direction perpendicular to the plane defined by the terminals 17a, 17b, 17c and 17d.

To suitably adjust the ratio which the input current to the Hall element 17 bears to the output current from the rectifier 16, there is connected a variable impedance means in connection with the Hall element 17 between the output terminal 16b of the rectifier and the output terminal 19b of the linearizing circuit device. Namely, between said output terminals 16b and 19b is connected a variable resistor $VR_0$ in parallel to the serially connected Hall element 17 and resistor $R_0$. Further between the input terminals 17c and 17d of the Hall element is connected a first group $VR_a$ of potentiometers consisting of, for example, four potentiometers $VR_{a1}$ to $VR_{a4}$ parallel to each other. To the output terminal 19b are connected the terminals on one side of a second group $VR_b$ of potentiometers consisting of, for example, four potentiometers $VR_{b1}$ to $VR_{b4}$ like the aforesaid first group of potentiometers and also the plus terminal of a D.C. source 21. The terminals on the other side of these potentiometers and the other or minus terminal of the D.C. source are connected with each other. Thus both ends of each of the second group of potentiometers are impressed with a fixed D.C. voltage E. Between the respective pairs of movable elements associated with the individual potentiometers of the aforesaid two groups $VR_a$ and $VR_b$ are connected the corresponding resistors $R_1$ to $R_4$ and diodes $D_1$ to $D_4$ in such a manner that current flows in the forward direction, namely, from the second group $VR_b$ of potentiometers to the first group $VR_a$ of potentiometers There has been described the arrangement of a linearizing circuit device for an electromagnetic log according to an embodiment of the present invention. There will now be explained the operation of said embodiment. As previously described, the Hall element 17 receives a direct current as an input current at the input terminals 17c and 17d and is supplied with an alternating field generated by the electromagnetic coil 20 which is energised by an A.C. source 12 like the magnetic coil of the detector 11. Accordingly, the Hall voltage generated across the output terminals 17a and 17b of said Hall element is an alternating type synchronising with the detected voltage obtained, as described above, from the detecting terminal of the detector 11. The detector voltage and Hall voltage are impressed in opposite phases on the primary winding 14a of the input transformer 14, which transforms a difference between these voltages to a suitable value. After being thus transformed, the differential voltage is conducted to the A.C. amplifier 15 through the secondary winding 14b for amplification and then supplied to the input side of the rectifier 16, where the A.C. voltage is rectified to a direct current. Said direct current is supplied from the output terminals 19a and 19b to the indicator 13 as an output current from the linearizing circuit device, namely, to indicate the water speed of a ship.

However, the value of the detected voltage and in consequence the output current indeed varies with the running speed of the ship, but, as described above, does not actually bear a linear ratio to said speed. There will now be described how said output current can be so compensated as to bear a linear ratio to the running speed of the ship. Where the indicator 13 is supplied with a D.C. output I circulating in the direction of the indicated arrow of FIG. 1, then a fractional current $I_F$ of said D.C. output I will run through a loop comprising the resistor $R_0$, input terminals 17c and 17d of the Hall element and diodes $D_1$ to $D_4$. A further fractional current $I_H$ of said current $I_F$ is supplied to the input terminals 17c and 17d of the Hall element in varying amounts according to the diodes $D_1$ to $D_4$ are conducted or unconducted.

On the other hand, the Hall element 17 is supplied, as described above, with an alternating field generated by the magnetic coil 20 energised by the A.C. source 12 which also actuates the magnetic coil of the detector 11. Accordingly, the voltage obtained from the output terminals 17a and 17b of the Hall element forms an alternating voltage having a magnitude proportionate to the product of the input current $I_H$ and the intensity of the alternating field. The Hall voltage is fed back to the input side of the input transformer 14, namely, the primary winding 14a in an opposite phase to the detected voltage, thereby forming a negative feedback loop. The present invention suitably adjusts the ratio which the input current $I_H$ to the Hall element bears to the output current I, that is, the ratio of negative feedback, according to the value of the output current I for its linearization.

The control of the ratio of $I_H$ to I is effected by the variable impedance means consisting of the aforesaid first and second groups of potentiometers and group of diodes. The respective potentiometers $VR_{b1}$ to $VR_{b4}$ of the second group $VR_b$ are impressed with a prescribed constant voltage by the D.C. source 21. From the movable element of each potentiometer is obtained a certain potential corresponding to the installed position of said element (a negative potential with respect to the potential of the output terminal 19b). These potentials are impressed on the anode side of the respective diodes $D_1$ to $D_4$. On the other hand, to the individual potentiometers $VR_{a1}$ to $VR_{a4}$ of the first group $VR_a$ is branched away to the aforesaid current $I_F$, a fraction of the output current I. From the movable element of each of said potentiometers is obtained a potential (negative potential with respect to the potential of the output terminal 19b) corresponding to the installed position of said element and the value of the branched current. These potentials are impressed on the cathode side of the respective diodes $D_1$ to $D_4$. However, said potentials inversely decrease according to increases in the value of the current branched away to the potentiometers and in consequence the value of the output current I. Accordingly, the potential differences $V_1$ to $V_4$ between the respective diodes $D_1$ to $D_4$ are more broadened in the forwared direction with the increasing output current. The movable elements attached to the individual potentiometers $VR_{b1}$ to $VR_{b4}$ of the second group $VR_b$ are so arranged as to allow the potentials obtained from the movable elements to decrease progressively from the potentiometer $VR_{b1}$ to the potentiometer $VR_{b4}$ in order to meet the undermentioned conditions. Namely, where the output current I does not reach a prescribed value $I_1$ while a ship is travelling at a given speed, any of the potential differences $V_1$ to $V_4$ assumes a smaller value than is required to conduct the related diodes $D_1$ to $D_4$, regardless of the position of the movable element of each of the potentiometers $VR_{a1}$ to $VR_{a4}$ of the first group $VR_a$, and where the ship speed increases and the output current I reaches the aforesaid prescribed value $I_1$, then only the potential difference $V_1$ will sufficiently increase to conduct the diodes $D_1$. (The potentials obtained from the movable elements of the potentiometers $VR_{a2}$ and $VR_{a3}$ are reduced with respect to the output terminal 19b as is the case with $VR_{a1}$. However, the potentials obtained from the movable elements of the potentiometers $VR_{b2}$ to $VR_{b4}$ assume a lower value than that obtained from the movable element of the potentiometer $VR_{b1}$ with respect to the output terminal 19b, so that the potential difference between the anode and cathode of the diodes $D_2$ to $D_4$ is not large enough to conduct said diodes.) Again where, the output current I reaches a prescribed value $I_2$, then the diodes $D_1$ and $D_2$ are conducted, regardless of the position of the movable elements of the potentiometers $VR_{a1}$ to $VR_{a4}$ of the first group $VR_a$. Further, if the output current I has a value of $I_3$, the diodes $D_1$, $D_2$ and $D_3$ are turned on, and in the case of $I_4$ all the diodes are actuated. This is the way in which there are disposed the movable elements of the respective potentiometers $VR_{b1}$ to $VR_{b4}$ of the second group $VR_b$.

With the circuit arranged as described above, where the output current I has a value of less than $I_1$, all the diodes $D_1$ to $D_4$ remain unconducted. In such case, even if the value of the output current I varies within the range of less than $I_1$, the ratio of said output current I to the input current $I_H$ supplied to the Hall element 17 does not change. Namely, said ratio will have a value defined by the variable resistor $VR_0$, the resistor $R_0$, the resistance value of the respective potentiometers $VR_{a1}$ to $VR_{a4}$ and the value of internal resistance across the input terminals 17c and 17d of the Hall element.

If the resistance of the variable resistor $VR_0$ is previously adjusted to a suitable value, then it is possible properly to control the value of the output current I and the ratio which said output current I bears to the current $I_F$ flowing through a circuit comprising the Hall element 17, resistor $R_0$ and potentiometers $VR_{a1}$ to $VR_{a4}$.

When the ship speed is accelerated to allow the output current I to reach the aforesaid value $I_1$, then only the diode $D_1$ is conducted, regardless of the position of the movable element of the potentiometer $VR_{a1}$. Accordingly, the ratio which the output current I bears to the input current $I_H$ and in consequence the ratio of negative feedback by the Hall voltage will assume a different value from that which will be obtained where the diode $D_1$ is not conducted, namely, the output current I has a value of less than $I_1$. If the position of the movable element of the potentiometer $VR_{a1}$ is adjusted with the diode $D_1$ conducted (the movable element may previously set at a prescribed position), it will be possible to control to a specified value the ratio which the output current I bears to the input current $I_H$, namely, the ratio of the aforesaid negative feedback. When the movable element of, for example, the potentiometer $VR_{a1}$ is disposed at the upper end thereof as indicated while the diode $D_1$ is conducted, then there is equivalently connected a serial composite resistance comprising the resistance of the resistor $R_1$, internal resistance of the diode $D_1$ in the forward direction when conducted and the resistance across the output terminal 19b and movable element of the potentiometer $VR_{b1}$ in parallel to the circuit consisting of the resistor $R_0$, potentiometers $VR_{a1}$ to $VR_{a4}$ and input terminals 17c and 17d of the Hall element 17, thus decreasing the ratio of $I_H$ to I, or the ratio of negative feedback. Accordingly, the gradient (ratio constant) of relationship between the ship speed and output current I tends to increase. Conversely where the movable element of the potentiometer $VR_{a1}$ is located at the lower end thereof as indicated, then there is equivalently connected the aforementioned serial composite resistance including that of the resistor $R_1$ in parallel to the resistor $R_0$. These two serial composite resistances are equivalently connected in series to the input terminals 17c and 17d of the Hall element 17 to increase the ratio of $I_H$ to I, and in consequence the ratio of negative feedback. Thus the gradiant of relationship between the ship speed and output current I is likely to decrease. Accordingly, when the output current I reaches a value of $I_1$ and the diode $D_1$ is conducted, the ratio of $I_H$ to I or ratio of negative feedback varies, and the value of said feedback ratio is controlled by the position of the movable element of the potentiometer $VR_{a1}$ at that time. Under the condition where the feedback ratio is limited to a prescribed value, said ratio is kept constant, if variations in the vessel speed and the value of the output current I fall within the range of more than $I_1$ but less than $I_2$.

In case the output current assumes a value of $I_2$ as a result of the elevated ship speed, then there will be conducted not only the diode $D_1$ but also the diode $D_2$, varying the ratio of $I_H$ to I. If, in this case, the movable element of the potentiometer $VR_{a2}$ is previously set at a prescribed position, the ratio of negative feedback will assume a desired value, controlling the gradient of relationship between the ship speed and output current I to a desired value.

The foregoing also holds true with the case where the vessel speed further increases to allow the diodes $D_3$ and $D_4$ to be conducted in turn. Obviously this reversely applies to the case where the ship speed successively decreases and the diodes become unconducted from $D_4$ to $D_1$ in turn.

As apparent from the description given above, this embodiment enables the point (the value of the output current I or the ship speed) the diodes $D_1$ to $D_4$ are selectively conducted according to the value of the output current I and in consequence the point the ratio of negative feedback begins to change to be defined by the installed position of the movable elements of the respective potentiometers $VR_{b1}$ to $VR_{b4}$ of the second group $VR_b$. Further, this embodiment makes it possible to control by the fitted position of the movable elements of the respective potentiometers $VR_{a1}$ to $VR_{a4}$ of the group $VR_a$ the value of said feedback ratio prevailing between the consecutive points when there occurs the selective conduction of the diodes or the ratio of negative feedback changes.

Accordingly, though the detected voltage obtained from the detecting terminals 11a and 11b of the detector 11 may not bear a prescribed linear ratio to the vessel speed, the setting at a suitable prescribed position of the movable elements associated with the first and second groups $VR_a$ and $VR_b$ of potentiometers enables a negative feedback to be effected in a desired ratio previously defined according to the magnitude of the output current I and in consequence that of the detected voltage. Therefore, the gradient of relationship of that output current I and ship speed may be linearized macroscopically, though there may occur some minor deviations each time the feedback ratio varies. In other words, the detected voltage is compensated in such a manner as to bear a linear ratio to the ship speed with a fixed gradient and supplied to the indicator 13 as an output current from the linearizing circuit device. If, in this case, the number of the first and second groups of potentiometers and that of diodes are increased, there will be reduced the aforesaid deviations with the resultant desired high degree of compensation.

The impedance across the detecting terminals 11a and 11b of the detector 11 assumes an extremely large value, because said terminals are directly connected to the electrodes involved in the detector 11. From the standpoint of matching the impedance, therefore, the input impedance of the input transformer 14 can be elevated according to the aforesaid impedance, so that it is possible to increase the output impedance from the Hall element 17 whose output terminals 17a and 17b are serially connected, as shown, to the primary winding 14a of the input transformer 14, and in consequence widely vary the feedback ratio.

There will now be described another embodiment of the present invention shown in FIG. 2. This embodiment involves constant voltage diodes or Zener diodes $ZD_1$ to $ZD_4$ in place of the diodes $D_1$ to $D_4$ used in the preceding embodiment so as to eliminate the second group of potentiometers $VR_b$ and D.C. source 21. In other respects, this embodiment is of exactly the same arrangement as the former. Except for said Zener diodes $ZD_1$ to $ZD_4$, the same parts of FIG. 2 as those of FIG. 1 are denoted by the same numerals and description thereof is omitted. The anodes of the Zener diodes $ZD_1$ to $ZD_4$ are connected to the movable elements of the potentiometers $VR_{a1}$ to $VR_{a4}$ respectively and the cathodes thereof collectively to the output terminal 19b. Said Zener diodes are so connected as to allow their voltages to have different values, so that the feedback ratio can vary according to the different desired values of the output current I. Otherwise, this embodiment operates in the same manner and displays the same effect as the preceding one. Further, the circuit arrangement and operation of this embodiment is simplified to the extent that there are omitted, as described above, the potentiometers $VR_{b1}$ to $VR_{b4}$ of the second group $VR_b$ and D.C. source 21.

The aforementioned two embodiments involve, for briefness of description and illustration, two groups each consisting of four potentiometers and four diodes. However, it will be apparent that their numbers may be increased as required to elevate the degree of compensation. Where it is desired to employ an A.C. indicator, it may be connected between the output terminals of the A.C. amplifier 15. In such cases, it is preferred that the output terminals 19a and 19b be shorted or a resistor having a prescribed value of resistance be connected across them.

As mentioned above, the present invention enables the detected voltage to be electrically linearized without contact instead of using a mechanical means, for example, a motor as has been employed in the prior art linearizing device. Namely, according to the invention, the voltage detected by the detector (which does not bear a linear ratio to the water speed of a ship) is rectified by a rectifier provided with a negative feedback means consisting of a Hall element, and the rectified D.C. output is supplied to an indicator. The control of the negative feedback ratio can be carried out entirely electrically without contact by varying the ratio which the input current to the Hall element bears to the output current according to the value of said output current by means of a variable impedance means comprising groups of potentiometers disposed between the input terminals of the Hall element and those of semiconductor switching elements, for example, diodes. Therefore, the present invention fully eliminates the drawbacks encountered with the conventional mechanical linearizing means.

What is claimed is:

1. A linearizing circuit device for an electromagnetic log which comprises a rectifying means, electromagnetic coil, Hall element and variable impedance means and compensates the voltage detected by the detector of an electromagnetic log in such a manner to bear a linear ratio to the speed of a ship and supply the resultant output to the indicator of said electromagnetic log, wherein:
    (a) the rectifying means has a pair of input terminals to be connected to the detecting terminals of the detector and a pair of output terminals to be connected to the input terminals of the indicator so as to rectify the detected voltage to a direct output current and supply it to the indicator;
    (b) the electromagnetic coil is energised by an A.C. source to supply the Hall element with an alternating field synchronising with the detected voltage;
    (c) the Hall element has a pair of input terminals serially connected to one of the output terminals of the rectifying means and a pair of output terminals serially connected to one of the input terminals of said rectifying means, thereby receiving part of said output current as an input current and negatively feeding the Hall voltage generated by said input current and alternating field back to the input side of the rectifying means; and
    (d) the variable impedance means consists of a plurality of diode elements which are connected to the input side of the Hall element and impressed with a bias voltage due to resistance drop proportionate to said output current and selectively conducted according to the different desired values of said output current, said selective conduction of the diodes allowing the ratio which the input current to the Hall element bears to said output current to be adjusted to a desired level according to the magnitude of said output current, whereby the Hall voltage of the Hall element is adjusted to a desired value and in consequence the ratio of negative feedback is controlled to a desired value according to the magnitude of said output current.

2. A linearizing circuit device according to claim 1 wherein the rectifying means comprises an input transformer and A.C. amplifier, the input terminals of said rectifying means being connected to the detecting terminals of the detector through the A.C. amplifier and input transformer, and the Hall element has its output terminals serially connected to the primary winding of the input transformer.

3. A linearizing circuit device according to claim 1 wherein the variable impedance means is characterised in that
    (a) there is connected a resistor to one of the output terminals of the rectifying means in series to the input terminals of the Hall element,
    (b) there are connected a plurality of first potentiometers between the input terminals of the Hall element,
    (c) the ends on one side of second potentiometers paired with said first potentiometers are connected together and those on the other side of said second potentiometers are collectively connected to one of the resistor terminals which is disposed opposite to the other thereof connected to one of the input terminals of the Hall element,
    (d) the second potentiometers are connected parallel to a D.C. source,
    (e) there is connected each of a plurality of diodes between the respective pairs of movable elements associated with the first and second potentiometers, and
    (f) the movable elements of the second potentiometers are set at different prescribed positions, whereby the difference between the potentials obtained from the movable elements of the first potentiometers according to the magnitude of the output current and those obtained from the movable elements of the second potentiometers which is impressed on each of the plurality of diodes, can be varied to a prescribed value, allowing the diodes to be selectively conducted according to the different desired values of the output current, regardless of the installed position of the movable elements of the first potentiometers.

4. A circuit device according to claim 1 wherein the variable impedance means is characterised in that
    (a) there is connected a resistor to one of the output terminals of the rectifying means in series to the input terminals of the Hall element,
    (b) there are connected a plurality of potentiometers between the input terminals of the Hall element, and
    (c) there are connected a plurality of reference diodes between the movable elements of the potentiometers and one of the resistor terminals which is disposed opposite to the other thereof connected to one of the input terminals of the Hall element, whereby the reference diodes are selectively conducted according to the different desired values of the output current, regardless of the installed position of the movable elements of the potentiometers.

5. An electromagnetic log of which indicator is driven by a direct current so compensated as to bear a linear ratio to the ship speed which comprises:
(a) a linearizing circuit device according to claim 1,
(b) the detector whose detecting terminal is connected to the input terminals of the rectifying means involved in said circuit device consists of an electromagnetic coil for distributing an alternating field in the water under the ship bottom, a pair of electrodes disposed under the ship bottom in a manner to contact the water so as to detect the voltage induced by the alternating field and water flowing therethrough, and a pair of detecting terminals connected to said electrodes,
(c) the indicator has its input terminal connected to one of the output terminals of the rectifying means, whereby the electromagnetic coil of the circuit device is energized by the A.C. source which actuates the magnetic coil of the detector.

References Cited
UNITED STATES PATENTS 3,114,260   12/1960   Soller et al. _____ 73—181

DONALD O. WOODIEL, Primary Examiner

U.S. Cl. X.R.

73—194